INVENTOR.
Samuel M. Waas

Jan. 29, 1963 S. M. WAAS 3,075,295
NUT ROASTING MACHINE
Filed July 21, 1958 4 Sheets-Sheet 2

INVENTOR.
Samuel M. Waas
BY
ATTORNEY.

Jan. 29, 1963 S. M. WAAS 3,075,295
NUT ROASTING MACHINE
Filed July 21, 1958 4 Sheets-Sheet 3

INVENTOR.
Samuel M. Waas
BY
ATTORNEY.

Jan. 29, 1963 S. M. WAAS 3,075,295
NUT ROASTING MACHINE
Filed July 21, 1958 4 Sheets-Sheet 4
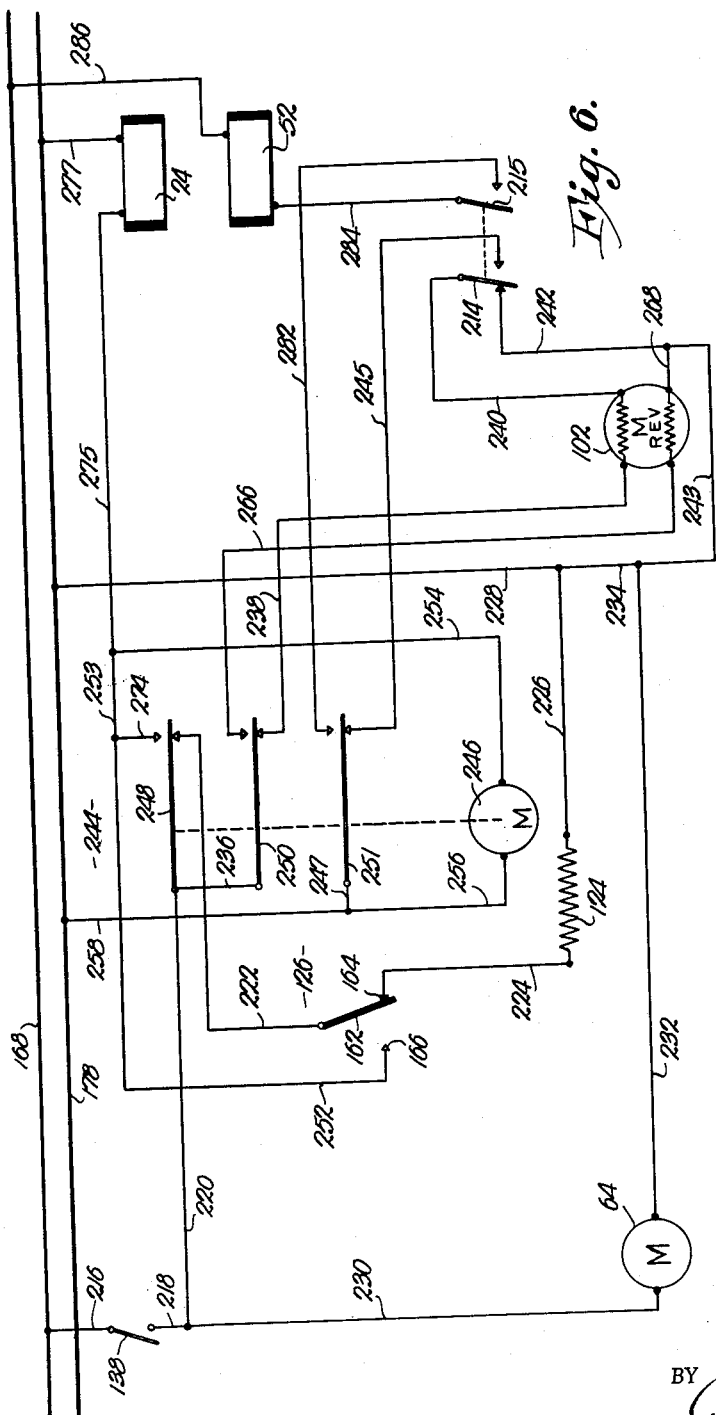
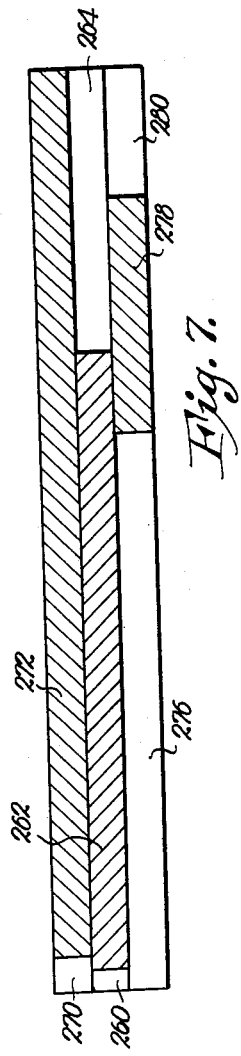
INVENTOR.
Samuel M. Waas
BY
ATTORNEY.

United States Patent Office 3,075,295
Patented Jan. 29, 1963

3,075,295
NUT ROASTING MACHINE
Samuel M. Waas, Kansas City, Mo., assignor to Manley, Inc., Kansas City, Mo., a corporation of Missouri
Filed July 21, 1958, Ser. No. 749,805
9 Claims. (Cl. 34—45)

This invention relates to an improved nut roasting machine and has for its primary object the provision of an automatic assembly capable of effecting successive cycles of operation without operator attention except for maintaining a supply of nuts to be roasted and emptying a collection pan as the same fills with roasted nuts.

It is the most important object of the present invention to provide a nut roasting machine having all of its components under direct control of an adjustable thermostatic switch, to the end that discharge of the nuts from a rotatable receptacle is governed by a predetermined maximum temperature in the receptacle and the commencement of each successive cycle is determined by a preselected minimum temperature in the receptacle, such temperature being lowered by the cold nuts delivered as a batch to the rotatable roasting receptacle.

Another important object of the instant invention is to incorporate time delay means in the electrical unit forming a part of the nut roasting machine so as to predetermine the extent of retrograde rotation of the receptacle and assure complete dumping of its contents into a collecting pan for the roasted nuts prior to the receptacle again rotating in its normal direction.

Still another object of the instant invention is to provide in the said electrical unit, means under control of the drive motor for the receptacle for determining the position of the receptacle when it comes to rest within the cycle to receive a fresh batch of cold nuts.

A further object of the present invention is to utilize the aforementioned thermostatic control for determining the commencement of rotation of the roasting receptacle after the same has been charged with a fresh supply of nuts and operable as the result of such cold nuts lowering the temperature of the circulating air within the roaster.

A still further object of the present invention is to provide a solenoid-controlled gate valve means for measuring each batch of nuts, the solenoids themselves being similarly under the control of the thermostatic switch which cuts in and interrupts the electric heater in proper coordination with each step of each cycle of operation.

An important aim of the present invention, in a preferred embodiment, is to provide a nut roasting machine employing the advantages of a thermostatic switch, insofar as timing the heat cycle is concerned, in accordance with the temperature rise in the roasting receptacle, but avoiding the disadvantages thereof by using the same solely as an impulse device to initiate operation of a cycle timer, whereupon the latter completely controls the entire sequence of operation, even to the extent of determining the time interval before the heater is again energized for the next succeeding batch.

A further aim of the instant invention is to provide in the last-mentioned embodiment, means for assuring complete dumping of all the contents of a given batch from the receptacle before the later is brought to rest in a position for receiving a new charge.

A still further aim of the invention is the provision of a nut roasting machine having means for positively preventing overheating or burning of new batches by the inclusion of means to effect rotation of the receptacle before the heater is re-energized.

Yet another aim of the instant invention is to provide a nut roasting machine having control means that assures charging of the receptacle with the entire measured contents of each batch by holding the receptacle stationary long enough to make such result possible.

Further, it is the aim and object of this invention to incorporate all the above advantages in a single machine while producing batch after batch of roasted nuts having virtually the same treatment regardless of wide variances in the quantity of nuts contained in each batch, making it unnecessary to change any settings as the size of the batches may vary or be varied.

In the drawings:

FIG. 6 is a view similar to FIG. 5, illustrating a modified form of the present invention; and FIG. 7 is a diagrammatical representation of the time cycle of the timer incorporated in FIG. 6.

Figure 1:
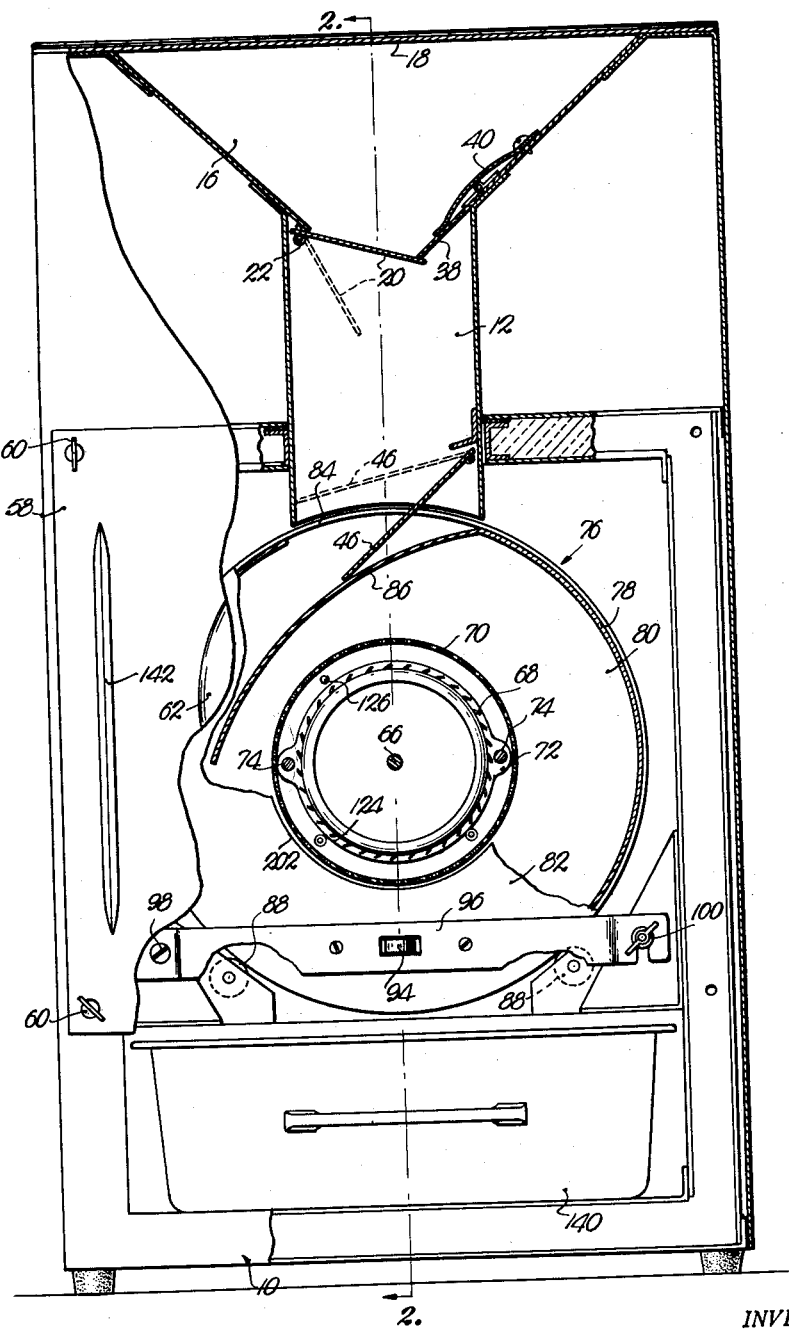
FIG. 1 is a front elevational view of a nut roasting machine made pursuant to my present invention, parts being broken away and in section to reveal details of construction.

An insulated cabinet broadly designated by the numeral 10, houses or supports all of the components of the nut roasting machine illustrated in the drawings. A measuring compartment 12 open at the uppermost and lowermost ends thereof, extends through top wall 14 of housing 10 and communicates with a hopper 16 provided with a hingedly mounted lid 18.

A gate valve 20 for the hopper 16 is attached to a shaft 22 journalled in the compartment 12 and operably coupled with an electromagnetic 24 through the medium of a pair of discs 26 and 28. Core 30 for the electromagnet 24, swings vertically as illustrated by dotted lines in FIG. 3, and the disc 28 is rigidly secured to shaft 32 for electromagnet 24 that is connected rigidly to its swingable core 30. Disc 26 is in turn rigid to the shaft 22, and a spring 34 interconnects the discs 26 and 28. The ends of spring 34 are connected to pins on discs 26 and 28 respectively, the pin for disc 26 extending through a slot 36 in the disc 28.

When the gate valve 20 is closed, as shown by full lines in FIG. 1, it engages an apron 38 swingably mounted on the hopper 16 and yieldably held in the position shown in FIG. 1 by a leaf spring 40. A spring 42 connecting with an arm 44 on the shaft 32, swings the gate 20 to the open open position shown by dotted lines in FIG. 1 when the electromagnet 24 is de-energized.

A second gate valve 46 is provided for the compartment 12 and mounted on shaft 48 that is rigid to swingable core 50 of an electromagnet 52. A spring 54 connected to arm 56 on shaft 48 swings the valve 46 to the closed position shown by dotted lines in FIG. 1 when the electromagnet 52 is de-energized.

A closure 58 for the front of the cabinet 10, is held in place by suitable fasteners 60. Closure 58 supports a foraminous housing 62 on its outermost face within which is contained certain of the electrical components of the machine hereinafter described. An electric motor 64 within the housing 62 has its drive shaft 66 extending through the closure 58 and operably coupled with a blower 68 disposed in a foraminous cylinder 70 secured to the inner face of closure 58. The innermost end of the shaft 66 is supported by vertical disc 72 that is in turn supported by rods 74 extending inwardly from closure 58.

A roasting receptacle 76 is rotatably mounted in the cabinet 10 beneath compartment 12 in surrounding relationship to the cylinder 70. Receptacle 76 has a cylindrical wall 78 spanning the distance between a pair of circular end discs 80 and 82. The wall 78 is provided with overlapping ends to present an opening 84 that spans the distance between the discs 80 and 82. To this end, an apron 86, which is coextensive in length with the distance between ends 80 and 82, extends inwardly into the receptacle 76 somewhat spirally toward the horizontal axis of rotation of receptacle 76.

Figures 2, 4:
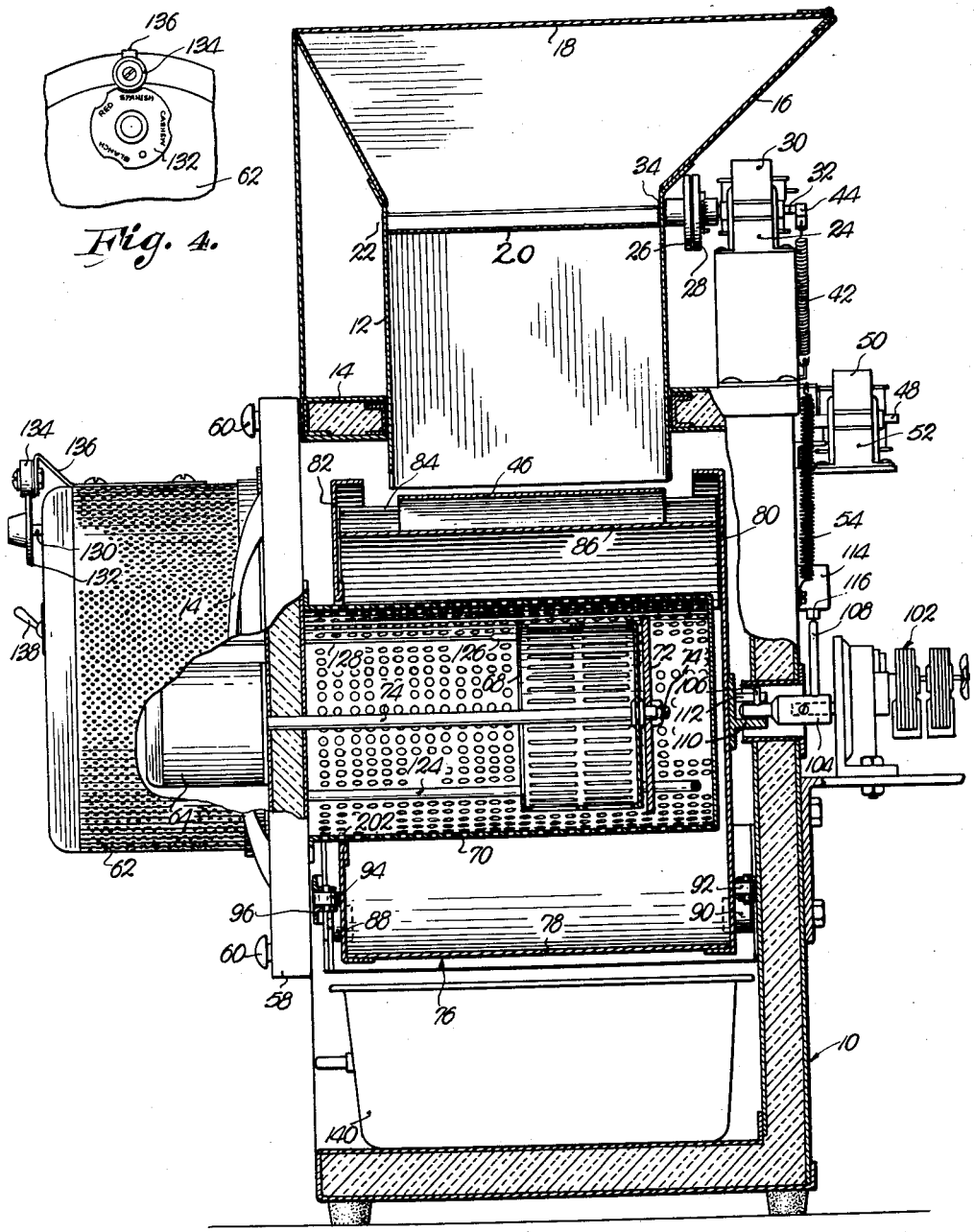
FIG. 2 is a side elevational view, parts being broken away and in section for clearness.
FIG. 4 is a fragmentary, detailed, front elevational view showing the manual control for the thermostatic switch.

Receptacle 76 is carried by a pair of rollers 88 supported by the cabinet 10 adjacent the closure 58, and a pair of similar rollers carried by the rear wall of cabinet 10, one only of which can be seen in FIG. 2, and designated by the numeral 90. Fore and aft movement of receptacle 76 is prevented by a roller 92 at the rear of the cabinet 10 and by a similar roller 94 mounted on a cross bar 96 between closure 58 and receptacle 76.

Bar 96 is swingably mounted on cabinet 10 by pintle 98 and releasably held in place at its opposite end through use of a wing nut 100.

A reversible electric motor 102 has a coupling 104 secured to its drive shaft which is in turn provided with a pair of lateral fingers 106 and 108. A tubular hub 110 rigid to the outer face of end disc 80, receives the coupling 104 and is provided with a slot 112 which in turn receives the finger 106. A switch 114 is mounted to dispose its actuating spring 116 within the path of travel of the finger 108 to the end that, during each cycle of rotation of the receptacle 76, pole 118 (see FIG. 5) of switch 114, is swung from a normal position engaging stationary contact 120 to a position engaging stationary contact 122.

A U-shaped electric heater 124 extends inwardly from closure 58 into the cylinder 70 in looped relationship to the blower 68, and a thermostat 126 within the blower 68 has its leads 128 passing through the closure 58 into operative relationship with an adjusting shaft 130 for the thermostat 126. A peripherally indented indicating disc 132 exteriorly of the housing 62, is normally in seated relationship with a roller 134 carrier by a spring element 136 mounted on housing 62. A manual switch 138 on the front face of housing 62 controls the circuitry shown in FIG. 5.

The front of the cabinet 10 beneath closure 58 is open for accessibility to an open top collection pan 140 disposed in cabinet 10 beneath receptacle 76.

Handles 142 are provided on the closure 58 to facilitate removal of the latter upon release of fasteners 60.

Figure 5:
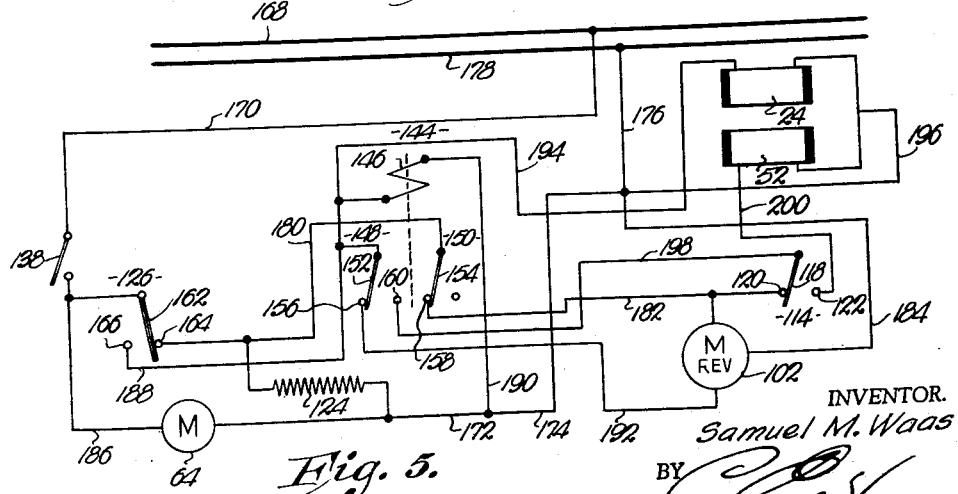
FIG. 5 is a schematic wiring diagram showing the electrical components of the machine.

In addition to the parts thus far described, the electrical components of the machine include, as shown in FIG. 5, a time delay relay 114 having a coil 146, and a pair of switches 148 and 150. Movable poles 152 and 154 of switches 148 and 150 normally engage stationary contacts 156 and 158 respectively. When coil 146 is energized, the poles 152 and 154 move out of engagement with their contacts 156 and 158 and the pole 152 engages a stationary contact 160.

When the circulating air within the receptacle 76 is at a predetermined minimum temperature, pole 162 of thermostat 126 engages stationary contact 164, and when such air is at a predetermined maximum temperature, the pole 162 is in engagement with a sationary contact 166.

When thermostat 126 is in the position shown in FIG. 5, closing of manual switch 138, cuts in the current to heater 124 through the following circuit:

From line 168, through wire 170, switch 138, pole 162 and contact 164 of thermostat 126, heater 124 and wires 172, 174 and 176 to line 178.

The motor 102 is provided with a pair of alternately available circuits for effecting rotation of the receptacle 76 in correspondingly opposite directions. When thermostat 126 is in the position shown in FIG. 5, one of such motor circuits in energized upon closing of switch 138 to rotate the receptacle 76 clockwise viewing FIG. 1, said motor circuit being traced as follows:

From line 168, through wire 170, switch 138, pole 162 and contact 164 of thermostat 126, wire 180, pole 154 and contact 158 of switch 150, wire 182, motor 102, and wires 184 and 176 to line 178.

Assuming that the receptacle 76 contains a batch of nuts, hot air is circulated through the nuts as the same tumble within the receptacle 76, such air being heated by heater 124. Closing of switch 138 causes the motor 64 for blower 68 to operate continuously through the following circuit:

From line 168, through wire 170, switch 138, wire 186, motor 64, and wires 172, 174 and 176 to line 178.

It is to be understood that, while the receptacle 76 is rotating in a clockwise direction, gates 20 and 46 are in the dotted line positions illustrated in FIG. 1, and the structure for receptacle 76 which includes the apron 86, permits such clockwise rotation of the receptacle 76 without discharge of its contents. Noteworthy also, is the fact that solenoids 24 and 52 are both de-energized during the roasting portion of the cycle and hence, both cores 30 and 50 are swung upwardly (illustrated by dotted lines in FIG. 3 with respect to core 30 only). Spring 42 holds the gate 20 open and spring 54 holds the gate 46 closed.

Clockwise rotation of the receptacle 76 continues until the circulating air therewithin reaches a predetermined maximum temperature as determined by the setting of the thermostat 126 through use of manual disc 132. At that time, pole 162 of thermostat 126 shifts out of engagement with contact 164 and into engagement with contact 166. This has no effect upon the above-described circuit for blower motor 64, but it does interrupt the current to heater 124 and breaks the circuit for motor 102 through switch 150.

As soon as pole 162 engages contact 166, the following circuit is established through coil 146 of relay 144:

From line 168, through wire 170, switch 138, pole 162 and contact 166 of thermostat 126, wire 188, coil 146 and wires 190, 174 and 176 to the line 178.

However, in view of the time delay characteristics of relay 144, energization of the coil 146 does not immediately shift the poles 152 and 154 of switches 148 and 150 respectively from the positions illustrated in FIG. 5.

Heating of the thermostat 126 to the aforementioned predetermined maximum temperature within the receptacle 76, also, simultaneously with closing of the circuit through coil 146, energizes motor 102 through the following circuit:

From line 168, through wire 170, switch 138, pole 162 and contact 166 of thermostat 126, wire 188, pole 152 and contact 156 of switch 148, wire 192, motor 102, and wires 184 and 176 to line 178.

Because of the structure in receptacle 76, which includes the apron 86, discharge of the contents of receptacle 76 is effected upon rotation of receptacle 76 counter-clockwise, viewing FIG. 1, that such contents are dumped into the pan 140 through the opening 84 of the receptacle 76.

Figure 3:
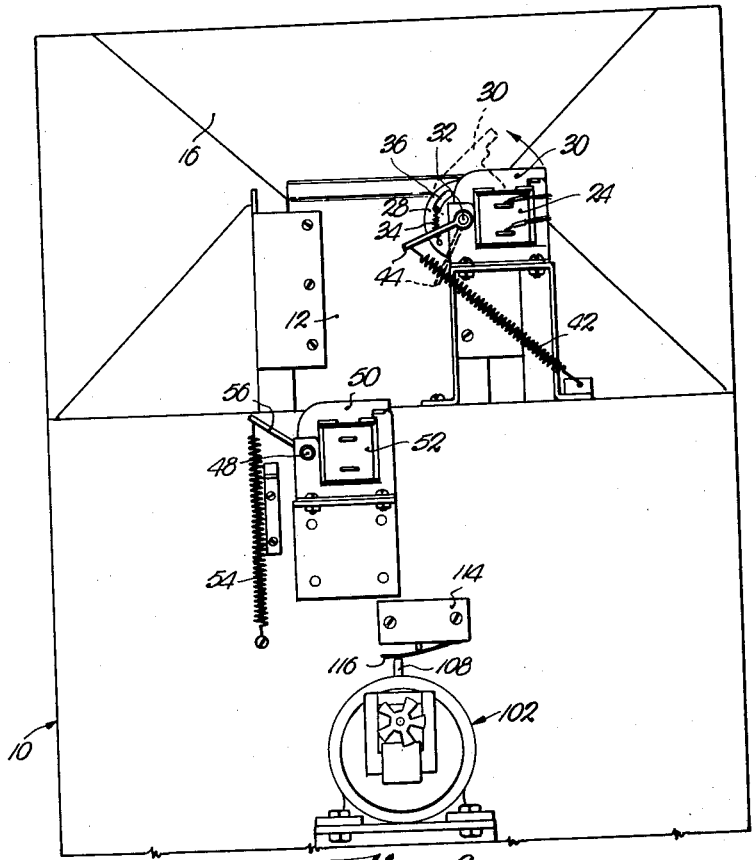
FIG. 3 is a fragmentary, rear elevational view.

Simultaneously with establishment of the aforementioned circuit through coil 146, and with reversal of the rotation of receptacle 76, solenoid 24 is energized to retract its core 30 to the full-line position shown in FIG. 3, thereby closing the gate valve 20 against the action of spring 42 to the full-line position shown in FIG. 1 through the following circuit:

From line 168, through wire 170, switch 138, pole 162 and contact 166 of thermostat 126, wires 188 and 194, electromagnet 24, and wires 196 and 176, to line 178.

After a predetermined period of time, for example 45 seconds, sufficient to assure dumping of the contents of receptacle 76 into pan 140, poles 152 and 154 shift from the position shown in FIG. 5 out of engagement with contacts 156 and 158 as the result of energization of coil 146, and when contact 160 is engaged by pole 152, the reversing cycle for motor 102 is broken and a third circuit is established for motor 102 to cause it to again rotate the receptacle 76 in a clockwise direction. Such circuit is traced as follows:

From line 168, through wire 170, switch 138, pole 162 and contact 166 of thermostat 126, wire 188, pole 152 and contact 160 of switch 148, wire 198, pole 118 and contact 120 of switch 114, motor 102 and wires 184 and 176 to line 178.

Such clockwise rotation of the empty receptacle 76 continues until, by virtue of the rotation of the drive shaft of motor 102, finger 108 actuates the switch 114 to move pole 118 thereof into engagement with contact 122.

This breaks the last described circuit for motor 102, and finger 108 is disposed to cause the receptacle 76 to come to rest in the position shown in FIG. 1 where its opening 84 is in register with the lower end of the measuring compartment 12.

Simultaneously with the stopping of motor 102 and, therefore, the receptacle 76, interengagement between the pole 118 and contact 122 of switch 114, energizes the electromagnet 52 through the following circuit:

From line 168, through wire 170, switch 138, pole 162 and contact 166 of thermostat 126, wire 188, pole 152 and contact 160 of switch 148, wire 198, pole 118 and contact 122 of switch 114, wire 200, electromagnet 52 and wires 196 and 176 to line 178.

Such energization of the electromagnet 52 retracts its core 52 downwardly as shown in FIG. 3 against the action of spring 54 to in turn swing the gate valve 46 to the full-line position shown in FIG. 1, thereby dumping a batch of cold nuts into the receptacle 76; such batch is measured by the capacity of compartment 12.

It is seen in FIG. 1 that when delivery of nuts is made to the receptacle 76 from the compartment 12 by opening of the gate 46, the fact that gate 20 is closed, as shown in FIG. 1, prevents flow of additional nuts from the hopper 16 to the compartment 12 during the charging of the receptacle 76 with nuts from compartment 12.

The receptacle 76 remains stationary with all parts in the position shown by full lines in FIGS. 1, 2 and 3 until the temperature of the circulating air within the receptacle 76 drops to a predetermined minimum, at which time such cooling of the thermostat 126 causes its pole 162 to reassume the position shown in FIG. 5 in engagement with contact 164.

Such return movement of the pole 162 again cuts in the current to heater 124, de-energizes the circuit through coil 146 so that switches 148 and 150 reassume the position shown in FIG. 5 and de-energizes both of the electromagnets 24 and 52, notwithstanding the fact that pole 118 for switch 114 is still in engagement with contact 122.

It can now be appreciated that, when the pole 154 moved out of engagement with contact 158, such movement prevented re-establishment of the current through heater 124, the latter remaining de-energized throughout the time that pole 162 of thermostat 126 remained in engagement with contact 166. De-energization of the coil 146 re-establishes the first-mentioned circuit for motor 102 and, therefore, the next succeeding cycle of operation is commenced, the machine continuing to operate in the same manner until switch 138 is opened.

It is apparent also from the foregoing, that the construction of the machine is such as to permit quick and easy cleaning of the receptacle 76, since it is but necessary to release fasteners 60 and remove the closure 58 from the cabinet 10. The cylinder 70 is readily removed from the receptacle 76 through opening 202 in end disc 82.

Thereupon, by release of wing nut 100 and swinging of the bar 96 to a position clearing the receptacle 76, the latter may be removed from the container 10 because of the fact that receptacle 76 merely rests upon the rollers 88 and 90 and a slip-fit is provided between hub 110 and the coupling 104, as well as the finger 106.

The provision of spring-loaded apron 38 is also advantageous since it accommodates for nuts that may become lodged between gate 20 and apron 38 when the former is swung to the closed position shown in FIG. 1 by energiztaion of electromagnet 24. Additionally, such lodgment of nuts between apron 38 and gate 20, will not prevent a full throw of the core 30 to the position shown in FIG. 3 because of the provision of the spring-loaded coupling 26—28, spring 34 accommodating for any failure of gate 20 to fully close in intimate contact with the lowermost edge of apron 38.

The adjustability of the thermostat 126 predetermines the maximum and minimum temperature range within which thermostat 126 is responsive. For example, it is seen that the disc 132 is provided with indicia to guide the operator in proper setting of the thermostat 126, depending upon the nature of the nuts to be roasted or the condition of such nuts at the time of discharge to the pan 140.

The embodiment illustrated in FIGS. 6 and 7 is substantially the same as in FIGS. 1–5 except that in lieu of relay 144, there is provided a cycle timer 244 having cams (not shown) driven by a motor 246, each of such cams controlling a corresponding switch 248, 250 and 251. Additionally, in lieu of a single switch 114 (FIG. 5) actuated by finger 108 (FIGS. 2 and 3) such finger 108 operates a pair of switches 214 and 215 (FIG. 6) that are ganged together as shown.

When thermostat 126 is in the position shown in FIG. 6, closing of manual switch 138 cuts in the current to heater 124 through the following circuit:

From line 168, through wire 216, switch 138, wires 218 and 220, switch 248, wire 222, pole 162 and contact 164 of thermostat 126, wire 224, heater 124, and wires 226 and 228 to line 178.

Closing of switch 138 energizes air circulating motor 64 as follows:

From line 168, through wire 216, switch 132, wires 218 and 230, motor 64, and wires 232, 234 and 228 to line 178.

Motor 102 also commences rotating in the normal direction for roasting, through the following circuit:

From line 168, through wire 216, switch 138, wires 218, 220, and 236, switch 250, wire 238, motor 102, wire 240, switch 214 and wires 242, 243, 234 and 228 to line 178.

The fact that switch 214 in the last described circuit is periodically actuated by finger 108, is of no consequence, since during the moment of such actuation, motor 102 remains energized through the following circuit:

From line 168, through wire 216, switch 138, wires 218, 220 and 236, switch 250, wire 238, motor 102, wire 240, switch 214, wire 245, switch 251, and wires 247 and 258 to line 178.

As soon as pole 162 moves into engagement with contact 166 (as the result of temperature rise in response to the operation of heater 124) the above-described circuit for heater 124 is broken and the timer motor 246 is energized as follows:

From line 168, through wire 216, switch 138, wires 218 and 220, switch 248, wire 222, pole 162 and contact 166 of thermostat 126, wires 252, 253 and 254, motor 246 and wires 256 and 258 to line 178.

Thermostat 126 has also energized solenoid 24, thereby separating compartment 12 and hopper 16 by the action of gate valve 20, as follows:

From line 168, through wire 216, switch 138, wires 218 and 220, switch 248, wire 222, pole 162 and contact 166 of the thermostat 126, wires 252, 253 and 275, solenoid 24, and wire 277 to line 178.

Energization of motor 246 commences ratation of the aforementioned cams, each of which completes a 360 degree cycle simultaneously during the time motor 246 is energized. The unshaded areas in FIG. 7 represent the periods of time that switches 248, 250 and 251 are in the position shown in FIG. 6 during operation of motor 246. And, the shaded areas in FIG. 7 represent the periods of time that switches 248, 250 and 251 are swung upwardly (viewing FIG. 6) during operation of motor 246.

Thus, as seen in FIG. 7, switch 250 is the first to be actuated upon energization of motor 246 and it, therefore, remains in the position of FIG. 6 only for a moment as represented by unshaded area 260. It remains in the up position for a period of time as seen by shaded area 262 and then its cam permits switch 250 to return to the position shown in FIG. 6 for a period represented by unshaded area 264 until motor 246 is again de-energized.

Therefore, shortly after motor 246 commences operating, the above-described circuit for motor 102 is broken by upward movement of switch 250 and the latter establishes the following reverse circuit for motor 102:

From line 168, through wire 216, switch 138, wires 218, 220 and 236, switch 250, wire 266, motor 102, and wires 268, 243 and 228 to line 178.

As seen in FIG. 7, switch 248 thereupon almost immediately moves upwardly, unshaded area 270 representing the time during which switch 248 remains as shown in FIG. 6. Shaded area 272 in FIG. 7 indicates the time during which switch 248 remains up, moving back again to the position shown in FIG. 6 at the completion of the cycle of motor 246.

When switch 248 moves up, motor 246 is no longer dependent upon thermostat remaining hot (closed with respect to contact 166) but the following new circuit is established by switch 248 for motor 246:

From line 168, through wire 216, switch 138, wires 218 and 220, switch 248, wires 274, 253 and 254, motor 246, and wires 256 and 258 to line 178. This last-mentioned circuit is broken automatically as seen by comparing areas 270 and 272, de-energizing motor 246 by virtue of the cam for switch 248, permitting the latter to return to the position shown in FIG. 6. By that time the thermostat 126 will have returned to the position shown in FIG. 6 and motor 246 will remain de-energized during the next cycle of energization of heater 124.

Switch 248 has now also energized solenoid 24, thereby maintaining compartment 12 and hopper 16 separated by the action of gate valve 20 regardless of cooling of thermostat 126, as follows:

From line 168, through wire 216, switch 138, wires 218 and 220, switch 248, wires 274, 253 and 275, solenoid 24 and wire 277 to line 178.

After a predetermined period of time, as indicated by unshaded area 276 in FIG. 7, during which time motor 102 is operating in reverse and the contents of receptacle 76 are being dumped, the cam for switch 251 cause the latter to move up (viewing FIG. 6) and switch 251 remains up for a period represented by shaded area 278 in FIG. 7, whereupon it returns to the position shown in FIG. 6 for the remainder of the cycle of motor 246 as seen by unshaded area 280 in FIG. 7.

At this juncture, it is to be emphasized that the period of time during which receptacle 76 rotates in reverse can be extended as long as necessary to positively assure dumping of all the nuts since such rotation is under the control of the cycle timer 244 rather than the thermostat 126 or a time delay relay as in FIG. 5.

In moving to the up position, switch 251 is not only readied to energize solenoid 52 through switch 215, but removes the alternate circuit for motor 102 through switch 214.

Accordingly, after switch 251 moves up, the next time finger 108 actuates switches 214 and 215, motor 102 stops and solenoid 52 is energized through the following circuit:

From line 178 through wires 258 and 247, switch 251, wire 282, switch 215, wire 284, solenoid 52 and wire 286 to line 168.

This, of course, actuates gate valve 46 to dump a new charge into receptacle 76 while the latter is stationary. Motor 102 remains de-energized until switch 251 returns to the position shown in FIG. 6 as determined by the period represented by shaded area 278, at which time a circuit is established for motor 102 in the direction for roasting, through switch 250. It is important to appreciate that here again, the period of time during which receptacle 76 remains stationary may be sufficiently long to assure complete emptying of compartment 12.

Note, by comparing shaded areas 262 and 278, that switch 250 returned to the position shown in FIG. 6 while switch 251 remained up. The last-mentioned circuit is traced as follows:

From line 168, through wire 216, switch 138, wires 218, 220, and 236, switch 250, wire 238, motor 102, wire 240, switch 214, wire 245, switch 251, and wires 247 and 258 to line 178.

At the time switch 251 moved down to energize motor 102, the circuit through solenoid 52 was broken, notwithstanding the fact that finger 108 was holding switch 215 closed; gate valve 40 is thereby retracted to the dotted line position shown in FIG. 1 before receptacle 76 commences rotating.

The switches 250 and 251 are now in the position shown in FIG. 6 and by the time switch 248 returns to such position (as determined by the period of time represented by area 272) the thermostat 126 will have cooled, its pole 162 re-engaging contact 164.

Therefore, the period of time consumed by the cycle is determined by setting or selection of the timer 244. Each succeeding roasting step, commenced upon energization of heater 124, must await de-energization of motor 246 whether or not in the interim, thermostat 126 has cooled to the position shown in FIG. 6. By proper setting or selection of timer 244, thermostat 126 may be employed only as a control to determine the roasting period and not be used to determine when motor 102 commences to rotate with the new batch as in the form of the invention illustrated by FIG. 5. But, as in the case of the FIG. 5 embodiment, timer 244 operates as time delay means to predetermine the extent of retrograde rotation of receptacle 76.

Therefore, long before the heater 124 is reenergized, the new batch will be agitating and no burning or overheating can occur because of the fact that heater 124 cannot operate when thermostat reassumes the position of FIG. 6 until after the motor 246 ceases to operate. The period of time during which timer 244 completes its cycle may be extended sufficiently to assure an immediate energization of heater 124 when motor 246 stops. But, in any event, heater 124 is always deenergized while the receptacle 76 is at a standstill.

Having thus described the invention what is claimed as new and desired to be secured by Letters Patent is:

1. A nut roasting machine comprising:
   (a) a support having a hopper thereon containing a supply of nuts;
   (b) a receptacle rotatably mounted on the support and having an opening therein for receiving nuts from said hopper when the opening is aligned with the latter, there being structure on the receptacle adjacent said opening for preventing discharge of the nuts from the receptacle as the latter rotates in one direction and for permitting discharge of the nuts therefrom as the receptacle rotates in the opposite direction;
   (c) a reversible electric motor carried by the support and operably coupled with the receptacle for rotating the latter in said directions;
   (d) an electric heater carried by said receptacle for heating the air and thereby the nuts therewithin;
   (e) first control means operably coupled with said motor and said heater responsive to the air temperature within said receptacle and adapted to be operably coupled with a source of electrical power for actuating said heater and driving said motor in said one direction when the receptacle contains nuts to be roasted and the air temperature within said receptacle reaches a predetermined minimum value;

(f) second control means operably coupled with said motor responsive to the air temperature within said receptacle and adapted to be operably coupled with said source for de-actuating said first control means when said air temperature reaches a predetermined maximum value and for driving said motor in said opposite direction to permit discharge of the nuts from said receptacle, said second control means including timing means disposed for actuation after a predetermined time interval has elapsed following the de-actuation of said first control means; and (g) third control means operably coupled with said motor responsive to the air temperature within said receptacle and the actuation of said timing means, and adapted to be operably coupled with said source for de-actuating said second control means and driving said motor in said one direction until said opening is aligned with said hopper for receiving nuts from the latter, said first control means being disposed for de-actuating said third control means when the air temperature within said receptacle reaches said predetermined value.

2. A nut roasting machine as set forth in claim 1, there being thermostat control structure common to said first control means, said second control means and said third control means.

3. A nut roasting machine as set forth in claim 2, wherein said thermostat control structure includes a single-pole, double-throw switch having a pair of spaced contacts operably coupled with the first control means and second control means respectively, the pole of said switch being alternately movable into engagement with each of said contacts for actuating the respective control means.

4. A nut roasting machine as set forth in claim 1, therein said timing means includes a time delay relay having a coil and a single-pole, double-throw switch, the latter being disposed for actuation and de-actuation upon the energization and de-energization of said coil respectively, to thereby respectively actuate and de-actuate said third control means.

5. A nut roasting machine as set forth in claim 1, wherein said timing means includes a cycle timer having a motor, cam means driven by said motor, and switch means associated with said cam means.

6. A nut roasting machine as set forth in claim 1, wherein said third control means includes switch means engageable with said receptacle and disposed to be opened to interrupt the rotation of said receptacle in said one direction when said opening is aligned with said hopper.

7. A nut roasting machine as set forth in claim 1, wherein is included:

(h) a nut-receiving compartment carried by the support between the hopper and the receptacle;

(i) a first gate valve at the junction of said compartment and said hopper;

(j) a second gate valve at the junction of said compartment and said receptacle; and (k) means operably coupled with said first and second gate valves respectively for manipulating said valves to thereby successively charge said compartment with nuts from said hopper and direct said charge of nuts into said receptacle to be roasted therein.

8. A nut roasting machine as set forth in claim 7, wherein said valve manipulating means includes first solenoid means coupled with said first gate valve and said first control means for opening the first gate valve to permit nuts to pass into said compartment when said first control means is actuated, and second solenoid means coupled with said second gate valve and said third control means for opening the latter only when said opening in the receptacle is aligned with the hopper.

9. A nut roasting machine as set forth in claim 8, wherein said first solenoid means is disposed to close said first gate valve when said second control means is actuated.

References Cited in the file of this patent

UNITED STATES PATENTS

| | | |
|---|---|---|
| 1,981,603 | Mustonen | Nov. 20, 1934 |
| 2,188,969 | Waldvogel | Feb. 6, 1940 |
| 2,295,920 | Vermillion | Sept. 15, 1942 |
| 2,522,448 | Husk et al. | Sept. 12, 1950 |
| 2,670,292 | Emerson et al. | Feb. 23, 1954 |
| 2,700,225 | Schmid et al. | Jan. 25, 1955 |